Aug. 22, 1933.  H. E. CULLEN ET AL  1,923,915
SHAFT SEAL
Filed March 7, 1932    2 Sheets-Sheet 1
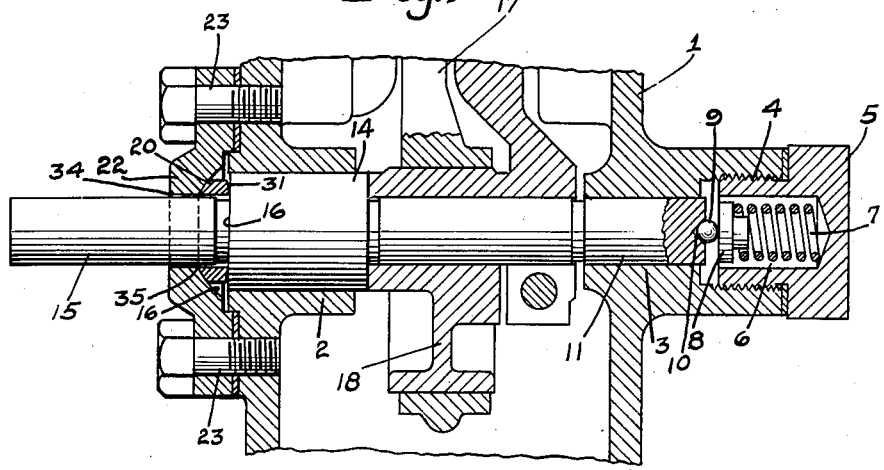
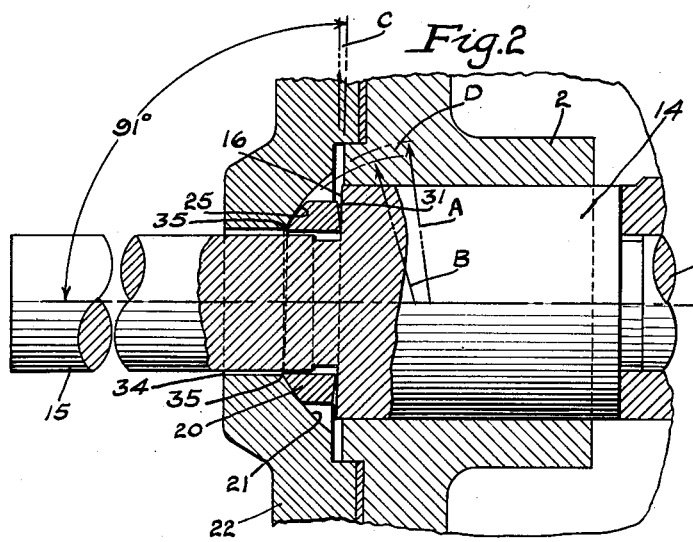
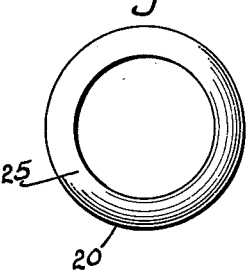
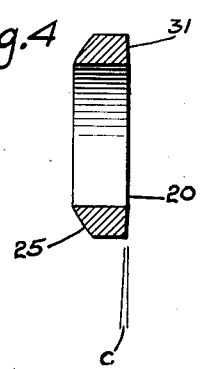
INVENTORS
HARRY E. CULLEN
HENRY O. RONNING
BY Paul, Paul & Moore
ATTORNEYS Aug. 22, 1933.  H. E. CULLEN ET AL  1,923,915
SHAFT SEAL
Filed March 7, 1932   2 Sheets-Sheet 2
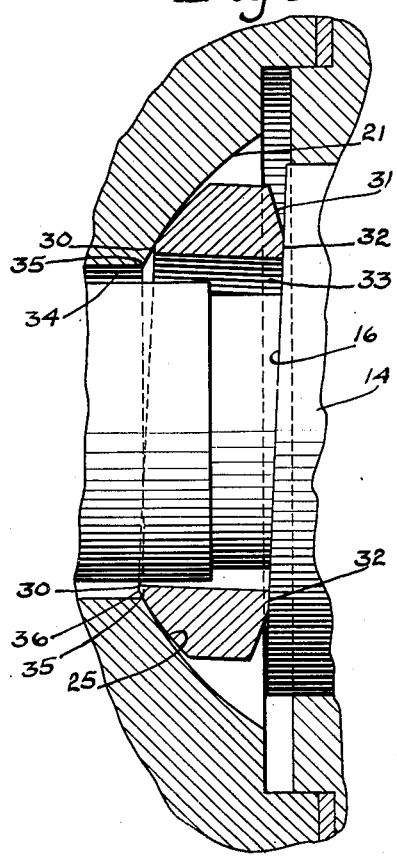
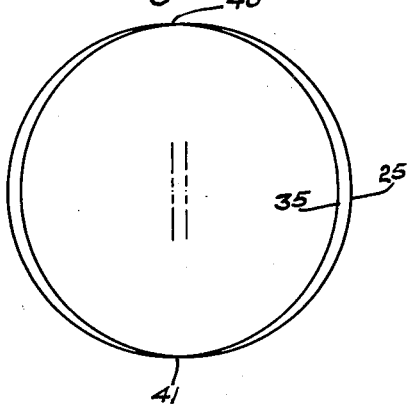
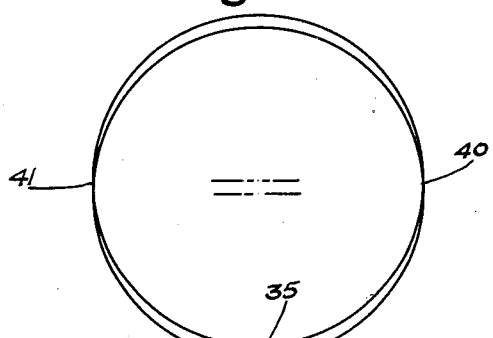
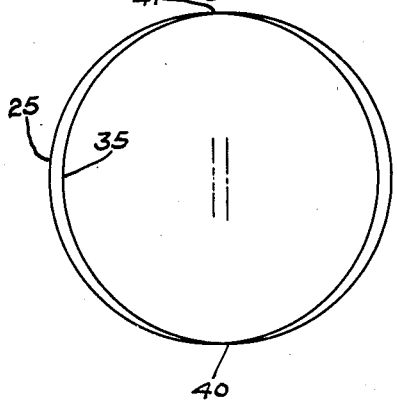
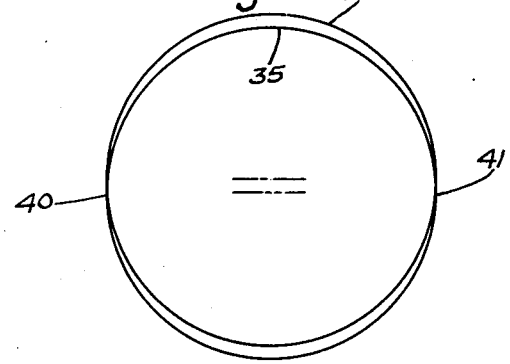
INVENTORS
HARRY E. CULLEN
HENRY O. RONNING
BY Paul, Paul & Moore
ATTORNEYS Patented Aug. 22, 1933

1,923,915

UNITED STATES PATENT OFFICE 1,923,915

SHAFT SEAL

Harry E. Cullen and Henry O. Ronning, Minneapolis, Minn., assignors to Henry P. Watson, Minneapolis, Minn.

Application March 7, 1932. Serial No. 597,364

6 Claims. (Cl. 286—7)

This invention relates generally to improvements in sealing rotative members, and is particularly directed to a sealing structure for a shaft which passes through a wall, for example, the crank shaft of the compression chamber of a compressor. We are aware that many attempts have been made to obtain proper seal in devices of this kind, but the devices now in use either do not seal, or they are expensive to manufacture, or to assemble, or there is a large amount of friction set up due to the shape of the parts and/or the method of applying. Among the objects of the invention are: to provide a simple and inexpensive sealing means which operates in a manner to transmit a minimum amount of friction to the shaft; to provide a construction, the parts of which can be very easily assembled or disassembled; and to prevent the accumulation of concretions (due to corrosion) at the sealing point or points.

Features of the invention include all the details of construction, along with the broader ideas of means inherent in the disclosure.

Objects, features and advantages of the invention will be set forth in the description of the drawings forming a part of this application, and in said drawings Figure 1 is a fragmentary vertical section through a compressor, showing the present invention applied to seal the crank shaft and drive shaft;

Figure 2 is a detail view corresponding to Figure 1 with the parts enlarged to more clearly show their exact relations;

Figure 3 is a face view of the sealing annulus;

Figure 4 is a diametric cross-section of the annulus;

Figure 5 is an enlarged section illustrating the shearing and surface-cleaning action of the ring; and Figures 6 to 9, inclusive, are diagrams further illustrating the circular shearing and cleaning action.

In the drawings, only those parts which are necessary to an understanding of the present embodiment of the invention are shown. The crank case is generally indicated at 1, and two opposite vertical walls of the casing are respectively provided with bearings 2—3. These bearings are integral with the case, and bearing 2 is extended inwardly from the inside of the case while bearing 3 is extended outwardly and has a screw-threaded bore 4 closed by a threaded plug 5 having a bore 6 as a spring socket. Spring 7 bears against a follower 8 which, in turn, engages a thrust ball 9 operating in depression 10 of one end of the crank shaft 11. The opposite end of the crank shaft has a cylindrical enlargement 14 which operates in the bearing 2, and one end of the shaft 15 extends to the outside of the compressor. To this extension is ordinarily attached the drive wheel (not shown). The connecting rod is indicated at 17 and cooperates in the usual manner with the eccentric 18 keyed to shaft 11.

Important objects of this invention are to provide a cheap efficient construction which can be easily assembled and disassembled, and to provide a construction which really maintains a seal. In compressors, the sealing elements are submitted to the corrosive action of gases, and corrosion occurs particularly as a result of oxidation on that side of the sealing system which is directly exposed to the atmosphere. It is, therefore, a particular object to keep the parts clean by friction and scraping to prevent accumulation of products of oxidation at the point mentioned.

The spring 7 constitutes means for yieldably applying pressure to the shaft in an axial direction to press the outer face of the cylindrical enlargement 14 against the sealing annulus now to be described. The outer plane face 16 of the cylindrical enlargement forms an obtuse angle with the rotative axis of the shaft. The angle is slight, being about 91 degrees. An annulus 20 loosely surrounds the shaft, that is the inner diameter of the annulus is greater than the diameter of the shaft portion 15 so that the annulus may move in a direction crosswise with reference to the shaft axis. The ring is operative within and against the surface of a spherical socket 21 formed in a cap plate 22 secured by bolts 23 at the outer side of the case. The use and placement of this plate is a feature. The ring has an outer spherical face 25 cooperative with the corresponding face of the socket 21.

The spherical surface of the socket is generated on a radius indicated at A in Figure 2, while the spherical surface 25 of the ring is generated on a radius indicated at B. The result is that these opposed surfaces are divergently related, that is they diverge in a direction away from the shaft axis or radial thereto. After the spherical surface 25 of the ring is formed, the ring is ground to slightly flatten it as at 30. The opposite side of the ring has the spherical or conical surface indicated at 31 and the inclined surface 16 of the end face of the shaft enlargement 14 and this conical or spherical surface are divergently related in a manner similar to that of the surfaces of the socket and opposite side of the ring. This side of the ring is also ground to flatten it as at 32, at a point adjacent the bore 33 of the ring. The angle of divergence between the faces 16 and 31 is indicated at C in Figures 2 and 4, and is comparatively slight. The angle of divergence of the surface 25 and socket surface is indicated at D in Figure 2.

The area of the flattened portion 30 may be increased, due to wear. However, it is a simple matter to replace the ring when that degree of wear has taken place which is inimical to its proper functioning. In practice, although the ring is made of brass, it is found that wear and flattening do not quickly take place. Of course, the degree of shearing movement has been exaggerated in the drawings as well as the angle which the inclined face of the shaft makes with the shaft axis. In practice, the overlap is generally slight, just sufficient to obtain a shearing action.

The bore of the cap plate 22 is indicated at 34 and the relation of the inner end of this bore 34 to the spherical surface 25 is an important feature of this invention. It is noted that as the shaft rotates, the annulus is tipped back and forth, or wobbled, and as a result of this tipping, that portion of the surface 25 which is nearest the bore 34 assumes an overlapping relation as at 36, with the edge 35 formed by the meeting surfaces of the bore 34 and socket 21. By this means, a scraping and shearing action is obtained somewhat in the manner of the blades of a scissor, although the shearing action is circular.

Figures 6 to 8 are diagrams illustrating the scissor-like relation. The figures correspond to successive quarter-rotations of the shaft. The scissor action takes place continuously at two points, respectively indicated at 40—41. In the diagrams, one circle represents the edge 35 and the other the surface 25. The successive displacements of the crossing points in clockwise direction, as the shearing action continues, is indicated in these figures. In Figure 6, the crossing point 40 is at the top; in Figure 7 at the quarter; in Figure 8 at the half; and in Figure 9 at the three-quarter point.

By inspection of Figures 5 to 8, it is noted that the construction assures the same number of "wobbles" of the ring or assures that these motions will constantly take place. This is partly due to the fact that the ring is not attached to the shaft and does not positively rotate with it and to the fact that it is loose around the shaft so that it may move laterally with respect to the axis of rotation. It may be said that in the present device there is less circular creeping of the ring and more wobbling, and that the wobbling motion has a definite relation to shaft motion. In other words, the relations of the ring to the shaft are not haphazard, but are definite, and this makes the self-cleaning action more positive, continuous and uniform. Moreover, what wear takes place is more uniform. Also, a minimum area of sealing surface is exposed to the atmosphere.

In some devices, a spherical ring is secured to and moves with the shaft, but this fixed ring is objectionable, because it either has to be formed integral with the shaft, or has to be shrunk on to prevent leakage. Proper action is not obtained where the ring is fitted to the shaft or where the curved or socketing faces are carried by a rotating element. Attention is called to the fact that although the ring may rotatively creep, yet it is not positively driven by the shaft, and the socket surface with which it cooperates is stationary. In our device, a circular shear or scissor-like action ensues and is continuous and not haphazard, while at the same time the seal is maintained and corrosive action on the sealing surfaces is substantially prevented due to the metal-surface-cleaning as a result of shearing action.

It is to be noted that all parts of the device are easily accessible from the outside of the casing, by removal of the plate, but are enclosed by the plate.

We claim as our invention:

1. A device of the class described having a wall, a shaft traversing the wall and rotative therein, a cap plate traversed by the shaft and secured to the wall and having a socket facing the wall, said shaft having an enlargement the end face of which faces the socket and is inclined to a plane perpendicular to its rotative axis, a ring loosely traversing the shaft and having working surfaces respectively sealingly engaging the end face of the enlargement, and the socket, whereby rotative motion tips the ring back and forth in axial direction, the parts being so proportioned that a shearing action occurs as a result of tipping of the ring.

2. A chamber having walls providing bearings, a shaft rotative in the bearings and having one portion passing through and to the outside of the chamber, a cap plate secured to the outside wall of the chamber and having an inwardly faced spherical socket and a bore traversed by the shaft, said shaft having an enlargement which has a plane face inclined to a plane perpendicular to its rotative axis, a ring loosely traversed by the shaft and having working surfaces respectively cooperating with the socket and inclined face, and means for applying force to move the shaft in an axial direction toward the ring.

3. A chamber having walls providing bearings, a shaft rotative in the bearings and having one portion passing through and to the outside of the chamber, a cap plate secured to the outside wall of the chamber and having an inwardly faced spherical socket, and a bore traversed by the shaft, said shaft having an enlargement which has a plane face inclined to a plane perpendicular to its rotative axis, a ring loosely traversed by the shaft and having working surfaces respectively cooperating with the socket and inclined face, the working surfaces being outwardly divergent from their lines of contact with the corresponding surfaces, and means applying force to move the shaft in an axial direction toward the ring.

4. A chamber having walls providing bearings, a shaft rotative in the bearings and having one portion passing through and to the outside of the chamber, a cap plate secured to the outside wall of the chamber and having an inwardly faced spherical socket and a bore traversed by the shaft, said shaft having an enlargement which has a plane face inclined to a plane perpendicular to its rotative axis, a ring loosely traversed by the shaft and having a surface cooperative with the socket surface, and having one face engaging the inclined face of the shaft, the bores of the cap plate and ring being so sized that an overlapping and shearing action between the edge of the plate bore and working face of the ring occurs as the ring is wobbled by the rotating inclined face of the shaft, and means for applying force to move the shaft in an axial direction toward the ring.

5. A shaft seal comprising a shaft, a ring loosely surrounding the shaft, a stationary member loosely traversed by the shaft, one face of said ring and member having sealing concavo-convex contact, and said shaft having a face inclined to a plane perpendicular to its rotative axis, the opposite face of the ring being sealingly engaged therewith.

6. A shaft seal comprising a shaft having a face inclined to a plane perpendicular to its rotative axis, a ring loosely surrounding the shaft, a stationary member traversed by the shaft, the faces of the ring being respectively sealingly engaged with corresponding faces of the shaft and stationary member, and said faces being so formed as to permit rocking of the ring in an axial direction, means for applying force to move the shaft in an axial direction to maintain sealing engagement between all of said faces during rotation of the shaft.

HARRY E. CULLEN.
HENRY O. RONNING.